United States Patent [19]
Melanson

[11] 3,914,657
[45] Oct. 21, 1975

[54] OVERVOLTAGE SURGE ARRESTER FOR ELECTRIC METERS

[75] Inventor: Roland J. Melanson, Rochester, N.H.

[73] Assignee: General Electric Company, Schenectady, N.Y.

[22] Filed: Nov. 19, 1973

[21] Appl. No.: 416,746

[52] U.S. Cl. ............... 317/61.5; 317/108; 324/110
[51] Int. Cl.² ........................................ H02H 9/06
[58] Field of Search .................. 317/61.5, 108, 105; 313/325, 231.1; 324/110

[56] References Cited
UNITED STATES PATENTS
3,417,277 12/1968 Becker .............................. 313/325
3,725,745 4/1973 Zisa .............................. 324/110 X

*Primary Examiner*—James D. Trammell
*Attorney, Agent, or Firm*—Vale P. Myles

[57] ABSTRACT

An electric meter of the type having a meter movement enclosed by a cover fastened to an insulating baseplate, through which pass two or more conducting members for supplying electrical current to the movement, is provided with an overvoltage surge arrester module mounted in the baseplate. The module comprises a disc-shaped wafer of varistor material, with a conductive contact layer on each face, fitted inside an insulating cup, a bottom face of the wafer being substantially parallel to, and spaced from, the bottom of the cup. A conductive electrode member is mounted on the outside cup bottom with an end passing through the bottom of the cup and spaced a predetermined distance from the bottom face of the water to form a gap in series with the wafer. The cup is inserted, open end first, into a receiving well in the outside of the baseplate and fastened in place. A spring contact in the receiving well contacts the opposite, top face of the wafer on insertion of the cup into the well.

5 Claims, 5 Drawing Figures

OVERVOLTAGE SURGE ARRESTER FOR ELECTRIC METERS

BACKGROUND OF THE INVENTION

The invention relates generally to the protection of electrical power systems against overvoltage surges, and particularly to such protection of secondary, low voltage, alternating current circuits.

Components of electrical power systems are generally protected against overvoltage surges, such as may result from lightning or switching, by overvoltage surge arresters. Arresters are important in protecting insulation in electrical power systems from exposure to voltages substantially above the normal system voltage at which the insulation might become permanently damaged. Such arresters act as a voltage-sensitive switch. When there appears on the system a voltage higher than a predetermined value, the arrester becomes a closed switch, providing a conductive path from the system to ground potential. Charge is drained from the system to ground until the voltage returns to the normal system voltage level, at which time the arrester clears and again becomes an open switch.

While overvoltage surge arresters are commonly found in power transmission systems and power distribution systems at various points, there is also a need for arresters in secondary systems, where the electrical power system is connected to a user. As the secondary system voltages are generally relatively low, components operating at these voltages are particularly susceptible to insulation damage as a result of an overvoltage surge, since they generally are not highly insulated.

It is particularly desirable for electrical utilities to protect the electrical meters, which are connected within the secondary systems, against overvoltage surge damage. Therefore, it has been the practice, especially in areas where electrical storms are common, to provide electrical meters such as watthour meters with built-In overvoltage surge arresters. These arresters are generally either a simple gap alone, or a gap in series with a non-linear resistance element, or varistor. Electrical meters having such arresters are described, for instance, in the following U.S. Pat. Nos:

2,889,494 issued 2 June 1959 to W. J. Schmidt et al.
3,501,667 issued 17 Mar. 1970 to R. J. Melanson
3,648,166 issued 7 Mar. 1972 to Redecker et al.

While a simple gap structure can provide protection for meters operating at voltages of 300 volts or less, meters operating at higher voltages, on the order of 480 volts and higher generally require a varistor element in series with a gap to assure proper clearing of the arrester at the system voltage. With such an arrangement, when an overvoltage surge appears on the power line, the gap sparks over, the varistor element becomes conductive, and a rather large impulse current of typically 500 – 1000 amperes passes to ground through the arrester. Thereafter, the voltage returns to the normal system voltage. At this voltage, however, because of the non-linear resistance of the varistor, the varistor allows only a rather limited amount of follow current on the order of a few amperes to pass through the gap. With this limited current, the arc cannot be maintained in the gap, and the arrester clears immediately.

Repeated operations of an overvoltage surge arrester of the varistor type can, however, result in certain types of damage to it, such as flashover damage to the insulation around it or degradation of the varistor. The causes of such damage have been largely overcome by various means in the more costly, larger types of arresters used for electrical power transmission and distribution systems. Certain aspects of overcoming such damage problems, however, include factors of special importance when applied to arresters for electrical meters.

One such factor of special importance is that of cost. Electrical meters are manufactured in very large quantities. In a rather high volume, competitive market situation, the cost of any particular feature such as an arrester must involve a minimum of materials and labor.

Another such factor is that of physical dimensions. The housings of electrical meters pose severe space restrictions for arresters, so the arrester must be small. Also, it is desirable that the shape be such as to make the arrester interchangeable with those of existing meters.

A third factor is that of reliability. A typical watthour meter may run as long as 30 years without requiring service. Thus, an arrester for such a meter must be initially somewhat critically designed in order to assure the requisite reliability, since in most cases the reliability for such a long period cannot be sufficiently established within a reasonable time during development.

A fourth factor is the ease of replacement. During the lifetime of an average meter, the meter may suffer several severe overvoltage surges. These surges may or may not result in some damage to the arrester. Should a meter be serviced by the utility for some reason, it is desirable that the serviceman be able to quickly replace the arrester components in order to be assured that any damage to them which may have occurred over the operating period up to that time will be inconsequential to the meter. For this reason, certain meters have been provided with replaceable surge arrester modules which are readily removed and installed in the baseplate of the meter without removal of the housing cover. The above-cited patent to Melanson illustrates such an arrangement. This module arrangement had been provided primarily, however, for the type of arrester having only a gap with, perhaps, a magnetic coil resistance wire cooperating with it. Meters provided with a varistor element commonly have the varistor element located inside the meter in order to prevent contamination of the varistor, with consequent flashover which might result in a failure of the arrester. The gap portion, on the other hand, has been located outside the meter in order to prevent gases generated by arcing of the gap from contaminating portions of the meter movement inside the housing. This makes it necessary to remove the housing cover in order to replace the varistor portion of the arrester.

SUMMARY OF THE INVENTION

In the present invention an electric meter is provided with a novel overvoltage surge arrester module mounted in a receiving well in the outside of the meter baseplate. The module comprises an insulating cup containing a disc-shaped wafer of varistor material with a conductive contact layer on both faces. The wafer is closely fitted inside the cup with a bottom face substantially parallel to, and spaced from, the bottom of the cup. A conductive electrode member is fixed to the cup with an end passing through the wall of the cup and spaced a predetermined distance from the bottom contact layer of the wafer.

The improved surge arrester module is capable of protecting at operating voltage of 480 volts and higher, while being relatively low in cost, small, interchangeable with prior modules in a substantial portion of existing meters, reliable, and easily replaced.

DESCRIPTION OF THE PREFERRED EMBODIMENT

Figure 1:
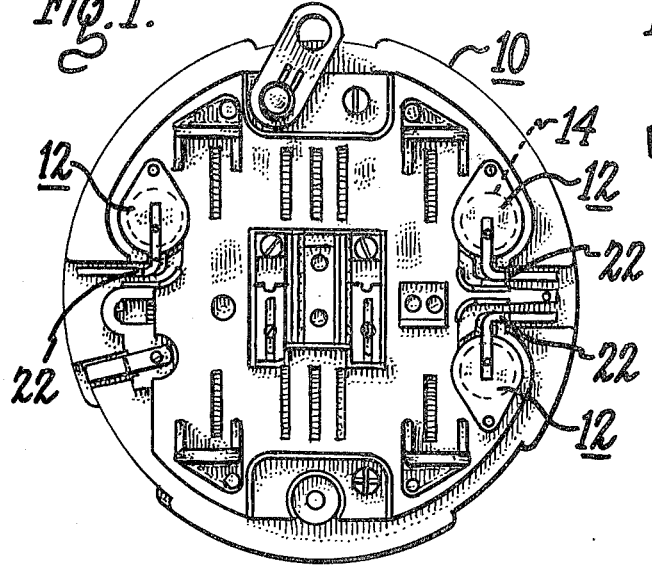
FIG. 1 shows the outside of the baseplate of an electric meter comprising 3 surge arrester modules in accordance with a preferred embodiment of the present invention.
Figure 2:
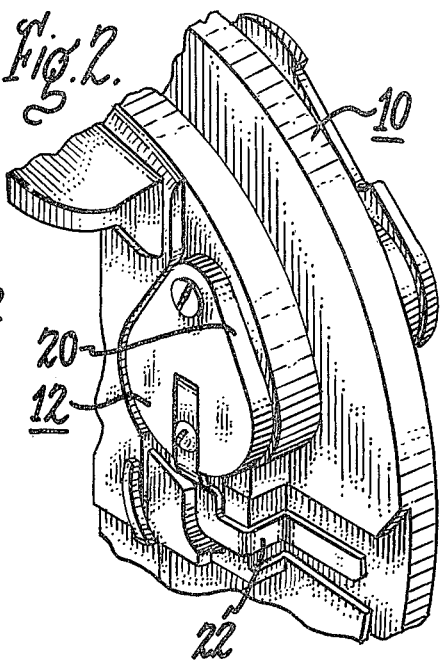
FIG. 2 shows in more detail a portion of the baseplate of FIG. 1, including one of the arrester modules of FIG. 1 installed in the base plate.

A preferred embodiment of the invention is in an electrical watthour meter, of which an outside view of the baseplate 10 is shown in FIG. 1. A meter movement may be secured to the other side of the baseplate 10 and a housing cover fastened over it to the baseplate 10. The movement and cover are not shown, since their illustration is not needed for an understanding of the present invention. The baseplate 10 itself includes various design features which are well understood by those skilled in the art of electrical watthour meters and are therefore not discussed here, except as where they relate particularly to the present invention. In the outside of the baseplate 10, there are provided three overvoltage surge arrester modules 12. One of the modules 12 is shown in more detail in FIG. 2 as installed in the baseplate 10 and also in FIG. 3, removed from its portion of the baseplate 10. As the three modules 12 in the baseplate 10 are substantially the same, only one module 12 will be discussed in detail here. Like numbers are used in the Figures of the drawings to refer to like portions of the structures described.

Figure 3:
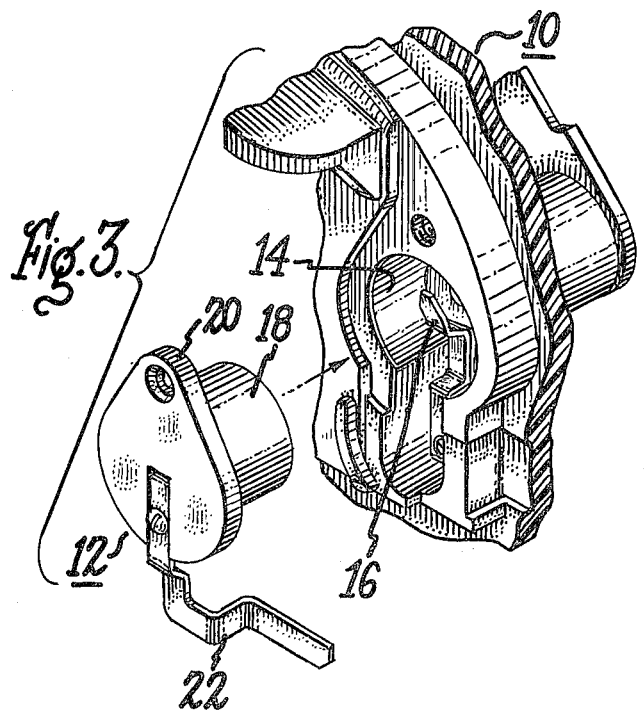
FIG. 3 shows the module of FIG. 2 separated from the baseplate.
Figure 4:
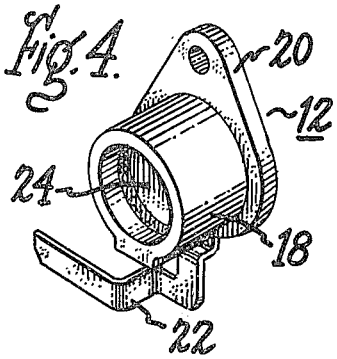
FIG. 4 shows a separate view of the other side of the module of FIG. 3.

Referring now to FIG. 3, the module 12 fits into a receiving well 14 in the baseplate 10 with leaf spring contact 16 in the bottom of the well 14. Another view of the module 12 alone is shown in FIG. 4. It may be seen from FIGS. 3 and 4 that the module consists of a cup 18, which is of a cast polyamide resin material, provided about its closed bottom wall end with an integral flange 20. A single hole is provided in the flange 20 for insertion of a screw to fasten the module 12 in place to the baseplate 10. Secured to the outside of the bottom wall of the cup 18 with an end portion extending through a rectangular opening in the bottom, is a flat, metal gap electrode 22.

Figure 5:
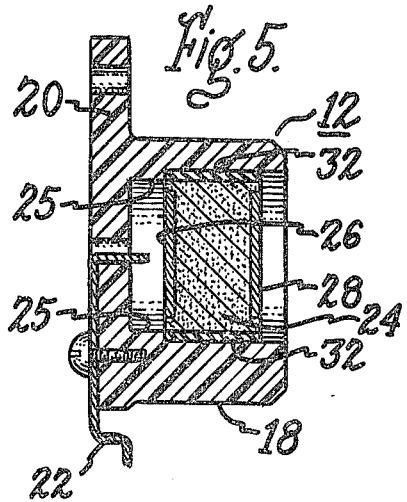
FIG. 5 shows a cross-section of the module of FIGS. 3 and 4.

The internal features of the module 12 are shown in FIG. 5, which shows the gap electrode 22 spaced from a disc-shaped varistor wafer 24, the wafer 24 resting on a shoulder 25 inside the cup 18. The wafer 24 is of a zinc oxide varistor compound fired to form a ceramic varistor. Metal oxide varistors are described, for instance, in "High Performance Ceramic Varistor Elements" by Ichinose, in Japan Electronic Engineering, July 1972, page 32 to 36. Particular compositions for such metal oxide varistors are described, for example in the following U.S. Pat. Nos.

3,689,863 issued 5 Sept. 1972 to Matsuoka et al.
3,598,763 issued 10 Aug. 1971 to Matsuoka et al.
3,496,512 issued 17 Feb. 1970 to Matsuoka et al.

The wafer 24 is 555 mils in diameter and 200 mils thick. It has a bottom face 26 towards the bottom of the cup 18 and top face 28. Both the faces 26, 28 are substantially covered by a thin, silk-screened conductive layer of silver for the purpose of more evenly distributing the current flow in the varistor.

The bottom face 26 of the wafer 24 is spaced a distance of 85 mils from the end of the gap electrode 22 to form a gap in series with the wafer 24. The top surface 28 of the wafer is contacted by the leaf spring contact 16 in the receiving well 14 of the baseplate 10 when the module 12 is inserted into the well 14. On installation of the assembled meter into a meter receptacle case, the portion of the gap electrode 22 extending from the module 12 contacts the grounded meter receptacle case. The spring contact 16 in the well 14 is connected internally of the meter housing to the electrical power input of the meter.

The space between the periphery of the varistor wafer 24 and the inside wall of the module cup 18 is filled with an epoxy sealant 32, as shown in FIG. 5.

When the above meter is subjected to an overvoltage surge, the air gap breaks down at a predetermined voltage and an arc forms across the gap between the gap electrode 22 and the bottom face 26 of the varistor wafer 24. The varistor wafer 24 becomes highly conductive, due to the impulse voltage impressed across it. A resulting large impulse current, typically on the order of 500 to 1,000 amperes, flows through the arrester module to ground before the system again returns to normal line voltage. Because the current-voltage characteristics of metal oxide varistor materials are generally highly non-linear, the current through the varistor wafer 24 at the system voltage is quite low, resulting in immediate extinguishing of the arc in the gap and a return to an open circuit.

Gases generated by the arcing in the gap during operation of the arrester module 12 are prevented from escaping around the outside edge of the varistor wafer 24 by the epoxy seal 32. This prevents a possible voltage flashover of the varistor wafer 24 under high surge current conditions. Gases which are generated by the arc in the gap can escape through the opening in the bottom of the cup 18 through which the gap electrode 22 passes.

It is a particularly advantageous feature of the novel module 12 that it is compatible with meters using the earlier types of overvoltage surge arrester modules as described, for instance, in the above mentioned patent to Melanson. While such earlier modules were used primarily below 300 volt levels, and were not suitable for voltage ratings of as high as 480 volts, the novel module may be used at 480 volt levels and higher with no significant increase in size.

GENERAL CONSIDERATIONS

An important feature of the novel module is the provision of the sealant around the periphery of the wafer to seal the space between the wafer and the inside wall of the module cup. In the absence of such sealing, gases generated by the arc during operating of the arrester can escape from the arcing chamber into this space and result in a voltage flashover between the faces of the arrester. Such a flashover is likely to cause the arrester module to fail permanently. Other insulating sealants may, of course, be used in place of the epoxy, provided that they have a sufficient electrical resistivity and can withstand elevated temperatures.

It is an important feature of the novel module that the gap electrode mounted on the bottom of the cup and extending through the opening in the bottom has its end thereby spaced a predetermined distance from the bottom face of the varistor wafer so that it will break down at a voltage below the outer insulation breakdown voltage. The electrode layer on the bottom face of the wafer is utilized as one of the gap electrodes, thus saving the space and cost of providing a separate electrode member for that purpose.

While the insulating material used for the module cup and flange is preferably one which generates arc-extinguishing gases when exposed to an arc, the favorable performance of the module when a metal oxide varistor wafer is used therein makes this unnecessary at secondary system voltages.

While the varistor of the preferred embodiment is a zinc oxide compound which has particularly favorable current-voltage characteristics, the wafer may be replaced by a similarly shaped wafer of a more commonly used varistor material, such as silicon carbide.

I claim:

1. An electrical meter of the type having a meter movement enclosed in a case, the case comprising an insulating baseplate through which pass two or more conducting members for supplying electrical current to the movement, and an overvoltage surge arrestor electrically connected between the conducting members and ground potential, wherein the improvement comprises:

an overvoltage surge arrestor module mounted substantially inside a receiving well that is open to the outside of the baseplate and sealed from the interior of the meter, the module being demountably inserted in the baseplate receiving well, open end first, the module comprising an insulating cup, a conductive electrode member and a disc-shaped wafer of non-linear resistance material, the wafer being closely fitted inside the cup with a bottom face substantially parallel to and spaced from the bottom of the cup, said wafer having a conductive contact layer on both faces, said conductive electrode member being fixed to the cup with an end passing through the wall of the cup to within a predetermined distance from the bottom face of the wafer to form an air gap in series with the non-linear resistance material, and a leaf-spring contact mounted in the bottom portion of the well to make a pressure contact with the top face of the wafer in the module.

2. The meter defined in claim 1, wherein the wafer is substantially of a metal oxide material.

3. The meter defined in claim 2, wherein the metal oxide is zinc oxide.

4. The meter defined in claim 3, wherein the space between the periphery of the wafer and the inside wall of the cup is sealed with an insulating, settable sealant.

5. The meter defined in claim 3, wherein the bottom of the cup has a flange of larger dimensions than the diameter of the receiving well, the flange being secured to the baseplate by a screw extending through a portion of the flange and into the baseplate.

* * * * *